UNITED STATES PATENT OFFICE 1,934,838

PRODUCTION OF HYDROCYANIC ACID

Leonid Andrussow, Mannheim, Germany, assignor to I. G. Farbenindustrie Aktiengesellschaft, Frankfort-on-the-Main, Germany No Drawing. Application April 6, 1931, Serial No. 528,239, and in Germany April 14, 1930

11 Claims. (Cl. 23—151)

The present invention relates to the production of hydrocyanic acid.

It is well known that hydrocyanic acid can be obtained by heating a mixture of gaseous or vaporous carbon compounds and ammonia in the absence or presence of catalysts. This reaction is strongly endothermic and in general high temperatures are required so that large quantities of ammonia are decomposed and lost. Thus, for example, the reaction $$CH_4+NH_3 \rightarrow HCN+3H_2$$

requires about 60000 calories and the reaction $$C_2H_4+2NH_3 \rightarrow 2HCN+4H_2$$

requires about 61300 calories which must be introduced into the reaction vessel. The supply of the large amount of heat required renders the process very difficult and tedious when it is to be carried out on a commercial scale. Moreover, losses by decomposition are liable to occur in the said processes. Even if the process be carried out with the aid of catalysts the reaction remains sluggish so that no particular advantages are gained by the employment of the catalysts.

Instead of externally applying heat and employing catalysts it has been suggested to make hydrocarbons react with ammonia in a flame produced by igniting a mixture of hydrocarbon with ammonia and a large quantity of oxygen so as to combust completely a large quantity of the hydrocarbon, preferably by explosions, for producing the heat necessary for the reaction between the remainder of hydrocarbon and ammonia. The difficulties of working and the cost of pressure-tight apparatus required when working on the explosion principle render also this process commercially inoperative especially in consideration of the bad yields obtained thereby.

I have found that hydrocyanic acid is obtained in a very advantageous manner by converting the endothermic reaction into an exothermic catalytic reaction by leading a mixture containing ammonia, at least one aliphatic, cycloaliphatic or aromatic hydrocarbon, in particular methane, and an appropriate amount of oxygen, or gases containing the same, at elevated temperatures over an oxidation catalyst especially those which promote the catalytic oxidation of ammonia. In this way the ammonia and the hydrocarbon are catalytically converted by the oxygen with the assistance of the catalyst with the result of hydrocyanic acid being formed with excellent yield. After the catalyst has been heated to about the reaction temperature at the start, it is generally maintained at this temperature by the heat evolved. In many cases, however, the catalyst must be even cooled or the composition of the gases must be varied in order to avoid superheating. By regulating the composition of the initial mixture the catalyst may be easily kept at the desired temperature.

In order to make the reaction exothermic the quantity of oxygen employed must amount to at least 10 per cent, by volume, of the sum of ammonia and hydrocarbon gas, but it must be less than would lead to complete combustion of the ammonia and hydrocarbons to water, carbon dioxide and nitrogen. The most appropriate amounts of oxygen are those corresponding to about 1 atomic proportion of oxygen for each molecular proportion of ammonia plus 1 atomic proportion of oxygen for each two atomic proportions of combined hydrogen in the amount of hydrocarbons required for supplying the necessary carbon to combine with the nitrogen, but a reasonably varied amount in either direction may be employed. Depending on the quantity of oxygen employed, the yields of hydrocyanic acid would vary but very good yields are obtained in the case of methane as a hydrocarbon, with about 1.5 molecular proportions of oxygen for a mixture of 1 molecular proportion each of ammonia and of methane; when employing hydrocarbons containing several carbon atoms, as many molecular proportions of ammonia are suitably employed as there are carbon atoms in each hydrocarbon molecule and the amount of oxygen is also correspondingly increased. About 2 molecular proportions of oxygen are advantageous when working with ethylene and about 2.5 molecular proportions when working with ethane (2 mols. of ammonia being used for 1 mol. of ethylene or ethane). In the latter case the reaction is as follows:

$$C_2H_6+2NH_3+2.5O_2 \rightarrow 2HCN+5H_2O$$
(+about 185,000 calories).

As already mentioned the ammonia and hydrocarbons must not be completely burnt and for this reason the quantity of oxygen must not be too high, a quantity considerably higher than for example 2 molecular proportions of oxygen when working with a mixture of 1 molecular proportion of methane and 1 molecular proportion of ammonia being avoided in order to prevent the formation of nitrogen and nitrogen oxides. The temperatures of working are usually between 500° and 1300° C., preferably between 700° and 1200° C., and the velocity of the gases passing the catalyst should be rather high, since otherwise the yields are diminished.

The course of the reactions in the case of ethylene and menthane is shown by the following equations:

$$C_2H_4 + 2NH_3 + 2O_2 \rightarrow 2HCN + 4H_2O + \text{about } 170000 \text{ calories,}$$
$$NH_3 + CH_4 + 1.5O_2 \rightarrow HCN + 3H_2O + \text{about } 113300 \text{ calories.}$$

The water formed reacts in part with methane with the formation of carbon monoxide and hydrogen. Carbon dioxide is not formed in appreciable amounts and after separating the hydrocyanic acid and the unconverted ammonia a gas mixture is obtained which may be employed, for example, for heating purposes. The process may be carried out at any pressure, i. e. at atmospheric, increased or reduced pressure, but, generally, about atmospheric pressure will be preferred as in this case the apparatus need not be pressure-tight.

Excess quantities of either hydrocarbon, or of ammonia, when present within the defined limits serve mainly as diluting media, which dilution may be also obtained by adding inert gases, such as nitrogen, which latter may be introduced by employing air instead of oxygen.

When employing an oxygen-containing gas rich in oxygen, instead of air, it is preferable to work in a cycle by leading the final gas or better still a more or less large portion thereof back into the reaction chamber after replacing the used portion of oxygen by adding fresh gas rich in oxygen.

As already intimated the ratio of hydrocarbon and ammonia may be varied within comparatively wide limits. In the case of methane it is preferable to select an amount of oxygen the ratio of which to the sum of ammonia and methane is less than 1. For obtaining particularly good results it is advantageous in many cases to employ quantities of hydrocarbon in excess to those theoretically required, as for example by from 10 to 20 per cent of the theoretical quantity corresponding to the above equations. This excess may be further increased with increasing molecular weight of the hydrocarbon, the said excess quantity being particularly suitable when working with methane. The optimum conditions depend of course also on the nature of the catalyst employed, the time of contact of the gaseous mixtures with the catalyst and of the composition and nature of the initial gases. With an efficient catalyst the time of contact may be extremely short, for example less than 1/1000 second. When employing hydrocarbon mixtures, such as natural gas and the like, the proportions are similar to those employed with methane. As already mentioned cycloaliphatic or even aromatic hydrocarbons may be employed though the aliphatic hydrocarbons usually give better yields. Suitable hydrocarbons are for example methane, ethane, ethylene, propylene or butylene and other lower members of the paraffin and alkylene series or mixtures containing same, as for example gases evolved in cracking mineral and like oils or in separating the hydrocarbon mixtures separated from coke-oven gases, for example by cooling, or fractions of such hydrocarbon mixtures. The said gases may contain higher aliphatic, cycloaliphatic or aromatic hydrocarbons and these higher hydrocarbons may be employed themselves. Hydrocarbons which are in the gaseous state at say 30° C. are, however, preferred since they furnish a purer product.

The catalysts may be chosen from oxidation catalysts infusible at the temperatures of working. Thus, for example, the noble metals, such as platinum, iridium, rhodium, palladium, osmium, gold, or silver may be employed as such or in the form of alloys with each other or with other metals. Other metals may also be employed, as for example those of the rare earths lanthanum, thorium, aluminium, iron, tin, zinc, cadmium, bismuth, uranium which base metals are employed in the form of their difficultly fusible compounds, such as simple oxides or phosphates or in the form of mixed phosphates, such as cerium-bismuth phosphates, uranium-tin phosphates or cerium-tin phosphates. The noble metal catalysts may be employed as such and usually in the form of nets or like structures, the base metal catalysts being preferably deposited in the form of their difficultly fusible compounds on a heat resisting carrier, such as silica gel or a gel of a metal oxide, such as alumina. In many cases the reaction proceeds best after some time of working say after from 20 to 30 hours.

The reaction is started by heating either the initial gases or the catalysts to the temperature required for the reaction or the gaseous mixture may be ignited by means of a flame, electric heating wire or the like, whereupon the reaction proceeds without any further addition of heat. Undesirable reactions, such as the formation of nitrogen and oxides of nitrogen, may be suppressed to a large extent according to the composition of the reaction gases and the nature of the catalyst and by regulating the temperatures and velocities of flow of the gases, the temperature being decreased, for example, by adding inert gases or effluent gases from a previous operation.

The resulting gas mixtures may either be cooled in order to separate the hydrocyanic acid or may be allowed to act at elevated temperatures, such as from 500° to 900° C., on alkali or alkaline earth metal oxides or hydroxides, for example of calcium, or salts which are readily converted into the same, as for example carbonates. In the latter case, in spite of the content of water vapor in the gas mixture which is preferably removed at least partially, the hydrocyanic acid is obtained in the form of nitrogen compounds, such as cyanides or cyanamides. It is preferable, when it is desired to produce salts, not to cool the hot gas mixture containing hydrocyanic acid considerably but to lead it directly over the material to be converted.

In this case it is advantageous when preparing the mixture containing hydrocyanic acid to add oxygen in the form of gas mixtures which are rather rich in oxygen in order to obtain higher concentrations of hydrocyanic acid.

The following examples will further illustrate the nature of this invention, but the invention is not restricted to these examples. The parts are by volume.

*Example 1*

A mixture of 10 parts of ammonia, 75 parts of air and 13 parts of a gaseous mixture containing 90 per cent of methane is passed at from 900° to 1000° C. through two fine meshed wire nets joined together and consisting of platinum containing 1.5 per cent of its weight of rhodium. With a velocity of flow of 150 to 200 liters per hour per square centimeter of the cross section of the catalyst 60 per cent (calculated with reference to the ammonia employed) of hydrocyanic acid, traces of oxides of nitrogen and also nitrogen are formed. 31 per cent of the ammonia remains unchanged. The hydrocyanic acid formed may be recovered as sodium cyanide by leading the reaction product into caustic soda or as such by cooling, preferably after removal of the ammonia by washing with dilute sulphuric or phosphoric acids.

*Example 2*

Each 45 liters of a gas mixture of 28 per cent by volume of ammonia, 25 per cent of methane, 1.5 per cent of ethane, 43 per cent of oxygen and 2.5 per cent of nitrogen are led per hour and at a bright red heat each through a platinum capillary 20 millimeters long and 0.6 millimeter in diameter. 37.8 per cent of hydrocyanic acid and 1.5 per cent of oxides of nitrogen calculated on the ammonia employed are formed. 42.4 per cent of the ammonia remains unchanged.

*Example 3*

A gaseous mixture consisting of 11.1 per cent of ammonia, 12 per cent of crude methane in the form of mineral gas, 15 per cent of oxygen, 0.8 per cent of hydrogen and 61.1 per cent of nitrogen is passed through three joint nets with fine meshes and consisting of platinum containing 10 per cent of rhodium, at from 980° to 1050° C. and at a velocity of 4000 cubic meters per hour and per square meter of the nets. 63 per cent of hydrocyanic acid, calculated on the quantity of ammonia employed, is obtained together with traces of nitrogen oxide, while 28 per cent of the ammonia remain unaltered.

*Example 4*

A mixture of 12 parts by volume of ammonia, 84 parts of air and 4 parts of a gaseous mixture consisting of 2 per cent of methane, 33.6 per cent of ethane, 42.8 per cent of propane, 8.2 per cent of butane, 1.2 per cent of ethylene, 3.3 per cent of propylene, 0.6 per cent of butylene and 8.3 per cent of nitrogen, is passed at from 800° to 900° C. through 2 joint nets of platinum wire with fine meshes. Hydrocyanic acid is obtained in a good yield.

*Example 5*

A mixture of 13 parts of ammonia, 70 parts of air and 10 parts of a mixture of hydrocarbons consisting mainly of methane and small quantities of its homologues, is led at 900° C. through a fine-meshed platinum wire net. The gases leaving the reaction vessel and which contain large amounts of hydrocyanic acid are led directly into a second container heated to about 600° C. and provided with quicklime. Calcium cyanamide is formed in good yields.

At temperatures below about 400° C. calcium cyanide is mainly formed. In a similar manner alkali metal cyanides may be obtained from solid or fused alkalies.

In some cases it is preferable to remove a part of the water vapor from the gas mixture before leading it over the quicklime.

*Example 6*

A gaseous mixture consisting of 10.7 per cent (by volume) of ammonia, 2.6 per cent of ethane, 19.6 per cent of methane, 12.8 per cent of oxygen and 53.5 per cent of nitrogen is led at from 800° to 850° C. and at a velocity of 1600 liters per hour over each liter of a catalyst consisting of 98 per cent of silica, 1 per cent each of alumina and of iron oxide ($Fe_2O_3$) and prepared by soaking wide-porous silica gel of from 3 to 6 millimeters with the nitrates of the metals of the aforesaid oxides, drying and heating to about 800° C. 53.2 per cent of hydrocyanic acid (calculated on the ammonia employed) is obtained, 39.0 per cent of ammonia remaining unaltered. Similar yields are obtained with a catalyst consisting of 96.2 per cent of silica, 2 per cent of calcium oxide, 1 per cent of alumina and 0.8 per cent of iron oxide.

*Example 7*

A mixture of 225 liters of ammonia, 1300 liters of air and 400 liters of an oil gas consisting in the average of 1.2 per cent of ethylene, 2.9 per cent of propylene, 0.2 per cent of butylene, 7 per cent of methane, 33.6 per cent of ethane, 46.3 per cent of propane, 1.3 per cent of butane, 0.6 per cent of oxygen and 6.9 per cent of nitrogen is led at about 800° C. and at a rate of 400 liters per hour over each liter of a catalyst consisting of wide-porous silica gel impregnated with cerium oxide and alumina. More than one half of the ammonia is converted into hydrocyanic acid and small quantities only of ammonia are lost. The gas mixture remaining after the separation of hydrocyanic acid has a higher content of olefines than the initial gas mixture and may be returned into the process after adding ammonia and oxygen or air or may be directly employed for other purposes.

Similar results are obtained with silica gel impregnated with lanthanum or with cerium-bismuth (1:1) phosphate or with uranium-tin (1:1) phosphate, which phosphates may be obtained by dissolving the metal oxides in concentrated phosphoric acid and precipitating by pouring into a large quantity of water. If desired the catalysts may be activated as described above with the aid of other metal salts.

What I claim is:

1. The process for the production of hydrocyanic acid which comprises passing a gaseous mixture comprising about equal volumes of ammonia, carbonaceous natural gas and oxygen and about 60 per cent of nitrogen over fine-meshed wire nets of platinum containing a small percentage of rhodium and heated to about 1000° C. at a velocity of about 4000 cubic meters per hour and per square meter of said nets.

2. The process for the production of hydrocyanic acid which comprises passing a mixture of about 225 liters of ammonia, about 1300 liters of air and about 400 liters of oil gas over silica gel carrying cerium oxide and alumina and heated to 800° C. at a velocity of about 400 liters per hour and liter of said silica gel.

3. A process for the production of hydrocyanic acid which comprises contacting with a hot oxidation catalyst a gaseous mixture containing ammonia, a vaporous hydrocarbon and sufficient oxygen to make the reaction exothermic, but less than would cause complete combustion of the ammonia and hydrocarbon.

4. A process for the production of hydrocyanic acid which comprises contacting with a hot oxidation catalyst a gaseous mixture containing ammonia, a vaporous hydrocarbon and at least 10% of oxygen calculated on the total volume of ammonia and hydrocarbon.

5. A process for the production of hydrocyanic acid which comprises contacting with a hot oxidation catalyst a gaseous mixture containing one part by volume of a vaporous hydrocarbon, about as many parts by volume of ammonia as the hydrocarbon contains carbon atoms in its molecule and oxygen in an amount greater than 10% calculated on the total volume of ammonia and hydrocarbon, but less than would cause complete combustion of the ammonia and hydrocarbon.

6. A process for the production of hydrocyanic acid which comprises contacting with a hot oxidation catalyst a gaseous mixture containing one part by volume of a vaporous hydrocarbon, about as many parts by volume of ammonia as the hydrocarbon contains carbon atoms in its molecule and oxygen in an amount approximately corresponding to that required to combine with two thirds of the hydrogen contained in the ammonia and all of the hydrogen contained in the hydrocarbon.

7. A process for the production of hydrocyanic acid which comprises contacting with an oxidation catalyst at between 500° and 1300° C. a mixture containing one part by volume of a vaporous hydrocarbon, about as many parts by volume of ammonia as the hydrocarbon contains carbon atoms in its molecule and oxygen in an amount greater than 10% calculated on the total volume of ammonia and hydrocarbon, but less than would cause complete combustion of the ammonia and hydrocarbon.

8. A process for the production of hydrocyanic acid which comprises contacting with a hot platinum metal catalyst a gaseous mixture containing one part by volume of ammonia, about one part by volume of methane and between about 0.2 and 2 parts by volume of oxygen.

9. A process for the production of hydrocyanic acid which comprises contacting with a hot platinum metal catalyst a gaseous mixture containing one part by volume of ammonia, about one part by volume of methane and about one and one half parts by volume of oxygen.

10. A process for the production of hydrocyanic acid which comprises contacting with a hot platinum metal catalyst containing platinum alloyed with another metal of the platinum group, a gaseous mixture containing one part by volume of ammonia, more than one part by volume of gaseous hydrocarbons and between 0.2 and 2 parts by volume of oxygen in the form of air.

11. A process for the production of hydrocyanic acid which comprises contacting with a hot oxidation catalyst a gaseous mixture containing ammonia, hydrocarbons belonging to the lower members of the aliphatic series and sufficient oxygen to make the reaction exothermic, but less than would cause complete combustion of the ammonia and hydrocarbons.

LEONID ANDRUSSOW.